United States Patent [19]

Grot

[11] 4,415,679
[45] Nov. 15, 1983

[54] PROCESS FOR ESTERIFYING FLUORINATED CARBOXYLIC ACID POLYMER

[75] Inventor: Walther G. Grot, Chadds Ford, Pa.

[73] Assignee: E. I. Du Pont de Nemours & Co., Wilmington, Del.

[21] Appl. No.: 314,973

[22] Filed: Oct. 26, 1981

[51] Int. Cl.$^3$ ................ B01J 47/12; B01J 39/20; C08F 8/14
[52] U.S. Cl. .................... 521/31; 525/337; 525/353; 525/385; 521/28
[58] Field of Search .............. 521/31, 33, 28; 525/251, 337, 353, 385

[56] References Cited

U.S. PATENT DOCUMENTS

| | | | |
|---|---|---|---|
| 3,991,018 | 11/1976 | Strop et al. | 526/30 |
| 4,067,825 | 1/1978 | Hradil et al. | 521/31 |
| 4,111,859 | 9/1978 | Strop et al. | 521/31 |
| 4,290,833 | 9/1981 | Kadija et al. | 156/94 |

*Primary Examiner*—Joseph L. Schofer
*Assistant Examiner*—Peter F. Kulkosky

[57] ABSTRACT

A process for preparing a fluorinated polymer having carboxylic ester groups from a corresponding polymer having carboxylic acid groups is disclosed, wherein the polymer having carboxylic acid groups is treated with a selected ortho ester, acetal, ketal, borate ester or sulfite ester. The process is useful for assuring that all of the carboxylate groups of a polymer are in the ester form before an extrusion or lamination procedure, both of which are performed with heat and pressure, so as to preclude decarboxylation of free carboxylic acid groups during such procedure.

14 Claims, No Drawings

PROCESS FOR ESTERIFYING FLUORINATED CARBOXYLIC ACID POLYMER

BACKGROUND OF THE INVENTION

Fluorinated ion exchange polymers having carboxylate functional groups, and optionally sulfonate functional groups as well, are known in the art. One principal use of such polymers is as a component of a membrane used to separate the anode and cathode compartments of an electrochemical cell such as a chloralkali electrolysis cell. Such membrane can be in the form of a reinforced or unreinforced film or laminar structure. Fabrication of such membrane is ordinarily carried out with polymer in melt fabricable form, i.e., wherein the carboxylic groups are —COOR functional groups where R is $C_1$ to $C_8$ alkyl, and, if present, sulfonic groups are in —$SO_2X$ form where X is F or Cl.

A carboxylic ester group which is attached to a carbon atom which in turn has one or more fluorine atoms attached thereto is, however, subject to easy hydrolysis by water in either the liquid or gaseous state to a free carboxylic acid group. Partial hydrolysis readily occurs during washing of polymer for the purpose of purifying it, during quenching of polymer pellets of film in an aqueous quench bath following extrusion of the polymer, and during storage of polymer in any physical form by moisture in the atmosphere.

It is undesirable for a polymer of the carboxylic type to have part of the carboxylic groups in the form of free carboxylic acid groups during melt fabrication thereof, such as extrusion into film and fabrication of laminar structures therefrom, e.g. lamination to films having sulfonyl halide functional groups or to reinforcing fabrics, for several reasons. First, inasmuch as a polymer with carboxylic acid groups has a higher melt viscosity at a given temperature than the corresponding polymer with carboxylic ester groups, in the interest of batch-to-batch uniformity of polymer to be melt fabricated into film, so that more uniform extrusion conditions can be used, conversion of any variable content of carboxylic acid to ester is desirable. Second, inasmuch as hydrolysis of carboxylic ester polymer probably occurs non-uniformly, i.e., to a great extent on the surface of cubes, pellets, film, etc., while to a much lower extent in the interior portions, such material even within a single batch is of non-uniform character or composition from point to point, and therefore will not extrude as uniformly from point to point as will a polymer which is all in the ester form. Third, at sufficiently high temperature, carboxylic acid groups will decarboxylate, which results in loss of some of the original ion exchange capability, i.e., a change to higher equivalent weight. Fourth, in fabrication of laminar structures from films, the higher melt viscosity of polymer having some ester groups hydrolyzed to acid groups interferes with good melt flow of the polymer during lamination, and thus leads to lower adhesion of the layers laminated to one another.

Additionally, it would be desirable to have an efficient process for esterifying carboxylic polymer which is substantially completely hydrolyzed, e.g. following use in an ion-exchange application, or after any intentional hydrolysis, as a first step in recovery of such polymer for reprocessing and reuse.

Reesterification of hydrolyzed carboxylic ester groups by the conventional technique of treating with an alcohol, with or without an acid catalyst, is, however, slow. It is also incomplete, inasmuch as water is a by-product of the esterification, and water leads to further hydrolysis; put another way, this reaction attains only an equilibrium between the ester and acid groups. Additionally, slow diffusion of by-product water out of the polymer through the newly esterified surface layer slows down this process.

It is therefore an object of this invention to provide an improved process, which is both rapid and substantially complete, for esterifying fluorinated polymers having carboxylic acid groups to polymer having carboxylic ester groups.

SUMMARY OF THE INVENTION

Briefly, according to the present invention, there is provided a process for esterifying carboxylic acid groups in fluorinated polymers by contacting the polymer with a borate ester, a sulfite ester, or specified carbon compounds enumerated below, such as ortho esters.

More specifically, there is provided a process for preparing a second fluorinated polymer having —COOR functional groups where R is $C_1$ to $C_8$ alkyl from a first fluorinated polymer having —COOH functional groups, which process comprises contacting said first polymer with a compound selected from the group consisting of

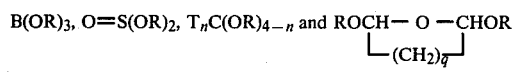

where n is 0, 1 or 2, T is H or $C_1$ to $C_8$ alkyl and two T's taken together can be —$(CH_2)_p$— where p is 4 or 5, and q is 2 or 3, at a temperature between 20° C. and the decomposition temperature of said compound, and separating said second polymer from the product of said contacting.

DETAILED DESCRIPTION OF THE INVENTION

The process of the present invention is useful in relation to a wide variety of fluorinated carboxylic acid ion exchange polymers.

The carboxylic polymer is typically a polymer having a fluorinated hydrocarbon backbone chain to which are attached the functional groups or pendant side chains which in turn carry the functional groups. The pendant side chains can contain, for example

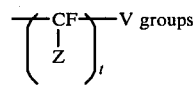

wherein Z is F or $CF_3$, t is 1 to 12, V is —COOR or —CN, where R is lower alkyl. Ordinarily, the functional group in the side chains of the polymer will be present in terminal

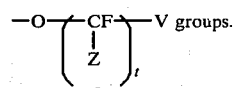

Examples of fluorinated polymers of this kind are disclosed in British Pat. No. 1,145,445, U.S. Pat. Nos.

4,116,888 and 3,506,635. More specifically, the polymers can be prepared from monomers which are fluorinated or fluorine-substituted vinyl compounds. The polymers are usually made from at least two monomers. At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen. Additionally, at least one monomer is a fluorinated monomer which contains a group which can be hydrolyzed to a carboxylic acid group, e.g., a carboalkoxy or nitrile group, in a side chain as set forth above.

By "fluorinated polymer" is meant a polymer in which, after loss of the R group by hydrolysis to ion exchange form, the number of F atoms is at least 90% of the number of F atoms and H atoms.

The monomers, with the exception of the R group in the —COOR, will preferably not contain hydrogen, especially if the polymer will be used in the electrolysis of brine, and for greatest stability in harsh environments, most preferably will be free of both hydrogen and chlorine, i.e., will be perfluorinated; the R group need not be fluorinated as it is lost during hydrolysis when the functional groups are converted to ion exchange groups.

One exemplary suitable type of carboxyl-containing monomer is represented by the formula

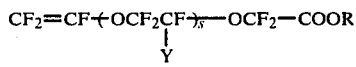

wherein
R is a lower alkyl,
Y is F or CF$_3$, and
s is 0, 1 or 2.

Those monomers wherein s is 1 are preferred because their preparation and isolation in good yield is more easily accomplished than when s is 0 to 2. The compound

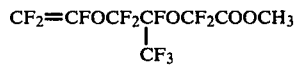

is an especially useful monomer. Such monomers can be prepared, for example, from compounds having the formula

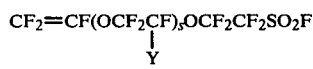

wherein s and Y are as defined above, by (1) saturating the terminal vinyl group with chlorine to protect it in subsequent steps by converting it to a CF$_2$Cl—CFCl— group; (2) oxidation with nitrogen dioxide to convert the —OCF$_2$CF$_2$SO$_2$F group to an —OCF$_2$COF group; (3) esterification with an alcohol such as methanol to form an —OCF$_2$COOCH$_3$ group; and (4) dechlorination with zinc dust to regenerate the terminal CF$_2$=CF— group. It is also possible to replace steps (2) and (3) of this sequence by the steps (a) reduction of the —OCF$_2$CF$_2$SO$_2$F group to a sulfinic acid, —OCF$_2$CF$_2$SO$_2$H, or alkali metal or alkaline earth metal salt thereof by treatment with a sulfite salt or hydrazine; (b) oxidation of the sulfinic acid or salt thereof with oxygen or chromic acid, whereby —OCF$_2$COOH groups or metal salts thereof are formed; and (c) esterification to —OCF$_2$COOCH$_3$ by known methods; this sequence, together with preparation of copolymers of such monomer, is more fully described in U.S. Pat. No. 4,267,364.

Another exemplary suitable type of carboxyl-containing monomer is represented by the formula

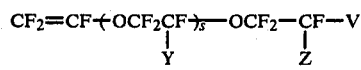

wherein
V is —COOR or —CN,
R is lower alkyl,
Y is F or CF$_3$,
Z is F or CF$_3$, and
s is 0, 1 or 2. The most preferred monomers are those wherein V is —COOR wherein R is lower alkyl, generally C$_1$ to C$_5$, because of ease in polymerization and conversion to ionic form. Those monomers wherein s is 1 are also preferred because their preparation and isolation in good yield is more easily accomplished than when s is 0 or 2. Preparation of those monomers wherein V is —COOR where R is lower alkyl, and copolymers thereof, is described in U.S. Pat. No. 4,131,740. The compounds

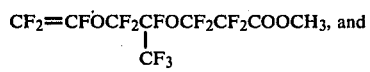

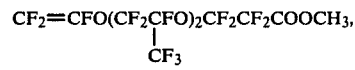

whose preparation is described therein, are especially useful monomers. Preparation of monomers wherein V is —CN is described in U.S. Pat. No. 3,852,326.

Yet another suitable type of carboxyl-containing monomer is that having a terminal —O(CF$_2$)$_v$COOCH$_3$ group where v is from 2 to 12, such as CF$_2$=CF—O(CF$_2$)$_3$COOCH$_3$ and CF$_2$=CFOCF$_2$CF(CF$_3$)O(CF$_2$)$_3$COOCH$_3$. Preparation of such monomers and copolymers thereof is described in British Pat. No. 1,518,387 and in U.S. Pat. No. 3,641,104.

Another class of carboxyl-containing polymers is represented by polymers having the repeating units

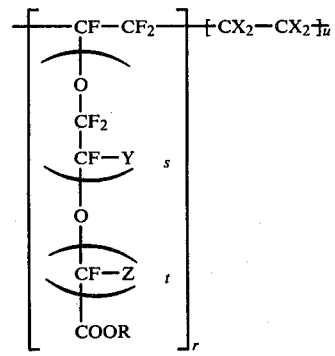

wherein u is 3 to 15,
r is 1 to 10,
s is 0, 1 or 2,
t is 1 to 12,
the X's taken together are four fluorines or three fluorines and one chlorine,
Y is F or $CF_3$,
Z is F or $CF_3$, and
R is lower alkyl.

A preferred group of copolymers are those of tetrafluoroethylene and a compound having the formula $$CF_2=CFO(CF_2CFO)_y(CF_2)_zCOOR,$$
$$\quad\quad\quad\quad\quad\quad |$$
$$\quad\quad\quad\quad\quad\quad Y$$

where
y is 0, 1 or 2,
z is 1, 2, 3 or 4,
Y is F or $CF_3$, and
R is $CH_3$, $C_2H_5$ or $C_3H_7$.

Also preferred are those copolymers having —$O(CF_2)_m COOH$ moieties, where m is 1,2 or 3, especially those where m is 2.

Such copolymers with which the present invention is concerned can be prepared by techniques known in the art, e.g., U.S. Pat. No. 3,528,954, U.S. Pat. No. 4,131,740, and South African Pat. No. 78/2225.

In the present invention, the carboxylic polymer may be in association with a polymer which contains sulfonic or sulfonyl functional groups. Such polymer is typically a polymer having a fluorinated hydrocarbon backbone chain to which are attached the functional groups or pendant side chains which in turn carry the functional groups. The pendant side chains can contain, for example, $$-CF_2-CF-SO_2W \text{ groups}$$
$$\quad\quad\;\; |$$
$$\quad\quad\;\; R_f$$

wherein $R_f$ is F, Cl, or a $C_1$ to $C_{10}$ perfluoroalkyl radical, and W is F or Cl, preferably F. Ordinarily, the functional group in the side chains of the polymer will be present in terminal $$-O-CF_2-CF-SO_2F \text{ groups}.$$
$$\quad\quad\quad\quad\;\; |$$
$$\quad\quad\quad\quad\;\; R_f$$

Examples of fluorinated polymers of this kind are disclosed in U.S. Pat. No. 3,282,875, U.S. Pat. No. 3,560,568 and U.S. Pat. No. 3,718,627. More specifically, the polymers can be prepared from monomers which are fluorinated or fluorine substituted vinyl compounds. The polymers are made from at least two monomers, with at least one of the monomers coming from each of the two groups described below.

At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group $$-CF_2-CF-SO_2F,$$
$$\quad\quad\;\; |$$
$$\quad\quad\;\; R_f$$

wherein $R_f$ is as defined above. Additional examples can be represented by the general formula $CF_2=CF-Q_k-CF_2SO_2F$ wherein Q is a bifunctional fluorinated radical comprising 1 to 8 carbon atoms, and k is 0 to 1. Substituent atoms in Q include fluorine, chlorine, or hydrogen, although generally hydrogen will be excluded in use of the copolymer for ion exchange in a chloroalkali cell. The most preferred polymers are free of both hydrogen and chlorine attached to carbon, i.e., they are perfluoroinated, for greatest stability in harsh environments. The Q radical of the formula above can be either branched or unbranched, i.e., straight-chain, and can have one or more ether linkages. It is preferred that the vinyl radical in this group of sulfonyl fluoride containing comonomers be joined to the Q group through an ether linkage, i.e., that the comonomer be of the formula $CF_2=CF-O-Q-CF_2-SO_2F$. Illustrative of such sulfonyl fluoride containing comonomers are $$CF_2=CFOCF_2CF_2SO_2F,$$

$$CF_2=CFOCF_2CFOCF_2CF_2SO_2F,$$
$$\quad\quad\quad\quad\quad\;\; |$$
$$\quad\quad\quad\quad\quad\;\; CF_3$$

$$CF_2=CFOCF_2CFOCF_2CFOCF_2CF_2SO_2F,$$
$$\quad\quad\quad\quad\quad\;\; |\quad\quad\quad |$$
$$\quad\quad\quad\quad\quad\;\; CF_3\quad\quad CF_3$$

$$CF_2=CFCF_2CF_2SO_2F, \text{ and}$$

$$CF_2=CFOCF_2CFOCF_2CF_2SO_2F$$
$$\quad\quad\quad\quad\quad\;\; |$$
$$\quad\quad\quad\quad\quad\;\; Cf_2$$
$$\quad\quad\quad\quad\quad\;\; |$$
$$\quad\quad\quad\quad\quad\;\; O$$
$$\quad\quad\quad\quad\quad\;\; |$$
$$\quad\quad\quad\quad\quad\;\; CF_3.$$

The most preferred sulfonyl fluoride containing comonomer is perfluoro(3,6-dioxa-4-methyl-7-octenesulfonyl fluoride), $$CF_2=CFOCF_2CFOCF_2CF_2SO_2F.$$
$$\quad\quad\quad\quad\quad\;\; |$$
$$\quad\quad\quad\quad\quad\;\; CF_3$$

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568.

A preferred class of such polymers is represented by polymers having the repeating units

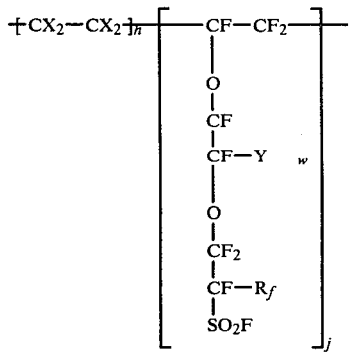

wherein h is 3 to 15, j is 1 to 10, w is 0, 1 or 2, the X's taken together are four fluorines or three fluorines and one chlorine, Y is F or $CF_3$, and $R_f$ is F, Cl or a $C_1$ to $C_{10}$ perfluoroalkyl radical.

A most preferred polymer is a copolymer of tetrafluoroethylene and perfluoro(3,6-dioxa-4-methyl-7-octenesulfonyl fluoride) which comprises 20 to 65 percent, preferably, 25 to 50 percent by weight of the latter.

Such copolymers can be prepared by general polymerization techniques developed for homo- and copolymerizations of fluorinated ethylenes, particularly those employed for tetrafluoroethylene which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0°–200° C. and at pressures in the range of $10^5$ to $2 \times 10^7$ pascals (1–200 Atm.) or higher. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2,2-trifluoroethane, and the like.

Aqueous techniques for preparing the copolymer include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium contacting both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

A copolymer which contains both carboxylic acid and other functional groups can also be used in the invention. For example, a terpolymer prepared from a monomer chosen from the group of nonfunctional monomers described above, a monomer from the group of carboxylic monomers described above, and additionally a monomer from the group of sulfonyl monomers described above, can be used in the invention.

It is further possible to use a blend of a carboxylic polymer and another polymer. For example, a blend made from a polymer having sulfonyl groups in melt-fabricable form and a polymer having carboxyl groups in melt-fabricable form can be prepared and, in form where at least some of the carboxylic groups are carboxylic acid groups, used in this invention.

It is additionally possible to use a laminar film in the present invention. For example, a film having a layer of a copolymer having sulfonyl groups and a layer of a copolymer having carboxyl groups can, in form where at least some of the carboxylic groups are carboxylic acid groups, be used in the invention.

When used to separate the anode and cathode compartments of an electrolysis cell, such as a chloroalkali cell, the sulfonate polymers dealt with herein, after conversion to ionizable form, should have a total ion exchange capacity of 0.5 to 2 meq/g (milliequivalents/gram), preferably at least 0.6 meq/g, and more preferably from 0.8 to 1.4 meq/g. Below an ion exchange capacity of 0.5 meq/g, the electrical resistivity becomes too high, and above 2 meq/g the mechanical properties are poor because of excessive swelling of the polymer. The relative amounts of the comonomers which make up the polymer should be adjusted or chosen such that the polymer has an equivalent weight no greater than about 2000, preferably no greater than about 1400, for use as an ion exchanger barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. Ordinarily, the equivalent weight will be at least 600, and preferably will be at least 900. Film of polymer having sulfonyl groups in ion exchange form preferably will have an equivalent weight in the range of 900 to 1500. For most purposes, however, and for films or ordinary thickness, a value no greater than about 1400 is preferred.

For the carboxylate polymers dealt with herein, when used to separate the compartments of a chloralkali cell, the requirements in respect to the ion exchange capacity thereof differ from those of the sulfonate polymers. The carboxylate polymer must have an ion exchange capacity of at least 0.6 meq/g, preferably at least 0.7 meq/g, and most preferably at least 0.8 meq/g, so as to have acceptably low resistance. The ion exchange capacity should be no greater than 2 meq/g, preferably no greater than 1.5 meq/g, and more preferably no greater than 1.3 meq/g. In terms of equivalent weight, the carboxylate polymer most preferably has an equivalent weight in the range of 770 to 1250.

Membrane used to separate the compartments of an electrochemical cell will generally have a thickness in the range of about 50 to 200 microns (2 to 8 mils), preferably 75 to 175 microns (3 to 7 mils).

Polymer subjected to the instant process may contain reinforcement therein which provides improved strength thereto. Such reinforcement can be in the form of individual fibers, non-woven paper or fabric, or woven or knit fabric; as used herein, the term "fibers" includes not only chopped fibers cut from filaments, but also fibrids and fibrils. Such reinforcement is ordinarily made of a perhalocarbon polymer. By "perhalocarbon polymer" is meant a polymer which has a carbon chain which may or may not contain ether oxygen linkages therein and which is totally substituted by fluorine or by fluorine and chlorine atoms. Preferaably the perhalocarbon polymer is a perfluorocarbon polymer, as it has greater chemical inertness. Typical such polymers include homopolymers made from tetrafluoroethylene and copolymers of tetrafluoroethylene with hexafluoropropylene and/or perfluoro(alkyl vinyl ethers) with alkyl being 1 to 10 carbon atoms such as perfluoro(propyl vinyl ether). An example of a most preferred reinforcement material is polytetrafluoroethylene. Reinforcement threads made from chlorotrifluoroethylene polymers are also useful. A typical non-woven structure is a microporous sheet of polytetrafluoroethylene having a microstructure characterized by nodes interconnected by fibrils, made by high-rate stretching at an elevated temperature of an unsintered, dried paste extrudate of polytetrafluoroethylene, as described in U.S. Pat. No. 3,962,153, and commercially available from W. L. Gore & Associates, Inc., under the trademark "Gore-Tex" expanded polytetrafluoroethylene.

For use in ion exchange applications and in cells, for example a chloralkali cell for electrolysis of brine, the polymer made by the instant process will ultimately have all of the functional groups converted to ionizable functional groups. Ordinarily and preferably these will be sulfonic acid and carboxylic acid groups, or alkali metal salts thereof, i.e., —COOM and/or —SO$_3$M functional groups, where M is Na, K or H. Such conversion is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath. Hydrolysis of carboxylic ester groups of these fluorinated polymers occurs so readily that it easily takes place under conditions prevailing in an electrolysis cell. Accordingly, a film of membrane wherein carboxyl groups are present in the form of —COOR where R is C$_1$ to C$_4$ alkyl can also be placed directly into an electrolytic cell, and the ester groups will hydrolyze, generally within a few hours.

For use in electrochemical cells, the copolymers described herein should be of high enough molecular weight to produce films which are at least moderately strong in both the melt-fabricable precursor form and in the hydrolyzed ion exchange form.

In the process of the present invention, a fluorinated polymer having —COOH functional groups is contacted with a compound selected from the group consisting of B(OR)$_3$, O=S(OR)$_2$, T$_n$C(OR)$_{4-n}$ and 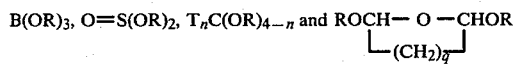

where R is C$_1$ to C$_8$ alkyl, preferably C$_1$ to C$_3$ alkyl, and most preferably methyl, n is 0, 1 or 2, T is H or C$_1$ to C$_8$ alkyl, preferably C$_1$ to C$_3$ alkyl and, when n is 2, two T's taken together can be —(CH$_2$)$_p$— where p is 4 or 5, and q is 2 or 3.

Examples of the borates are trimethyl borate and triethyl borate.

Examples of the sulfites are dimethyl sulfite and diethyl sulfite.

In T$_n$C(OR)$_{4-n}$, when n is 0, the compounds are orthocarbonates, such as tetramethyl orthocarbonate and tetraethyl orthocarbonate.

In T$_n$C(OR)$_{4-n}$, when n is 1, the compounds are again ortho esters. When T is H, they are orthoformates such as trimethyl orthoformate and tri-n-propyl orthoformate. When T is C$_1$ to C$_8$ alkyl, they are orthoacetates, orthopropionates, etc., such as trimethyl orthoacetate, triethyl orthoacetate, and trimethyl orthopropionate. A preferred such orthoester is trimethyl orthoformate.

In T$_n$C(OR)$_{4-n}$, when n is 2, the compounds are acetals and ketals. When both T's are H, the compounds are acetals of formaldehyde, such as diethoxymethane. When one T is H and the other T is C$_1$ to C$_8$ alkyl, the compounds are acetals of higher aldehydes, such as 1,1-dimethoxyethane. When both T's are C$_1$ to C$_8$ alkyl, the compounds are ketals, such as 2,2-dimethoxypropane or 2,2-dimethoxybutane. When the two T's taken together are —(CH$_2$)$_p$— where p is 4 or 5, the compounds are ketals of cyclic ketones, such as cyclopentanone dimethyl ketal and cyclohexanone dimethyl ketal.

The compounds

The compounds 

where q is 2 or 3 are substituted cyclic ethers, such as 2,5-dimethoxytetrahydrofuran and 2,6-dimethoxytetrahydrofuran.

In the process of the invention, the fluorinated polymer, which may be in comminuted or finely divided form such as pellets, granules, cubes, flake or fluff, or film or membrane, is contacted with one of the specified compounds at a temperature between 20° C. and the decomposition temperature of the compound, preferably between 25° C. and the boiling point of the compound, for a time sufficient to esterify substantially all of the free carboxylic acid groups to carboxylic ester groups. Ordinarily, at least 5 minutes is needed, and 10 minutes to 2 hours is usually suitable.

The polymer to be used in the process can either be dry, or have moisture absorbed therein. Any moisture in the polymer will react with the esterifying compound and consume part of the compound used, but will not otherwise affect the esterification reaction, which will still be rapid and complete so long as sufficient compound is used to react with both the water present and the carboxylic acid groups. For example, if moisture is present and trimethyl orthoformate is the compound used, they will react to form methanol and methyl formate, neither of which will interfere with esterification of the carboxylic acid groups. Although it is preferred to dry the polymer used in the process so that lesser amounts of the esterifying compound need to be used, it is not necessary to use polymer which has been dried.

Following the contacting step, the product polymer having esterified carboxylic groups is separated from excess esterifying reagent and by-products derived from it.

Although an inert liquid medium is not needed, one can be used, such as 1,2-dimethoxyethane. In many cases an excess of the compound itself serves as the medium.

The fluorinated polymer to be subjected to the process of the invention, especially if it is to be used in the form of a membrane in an electrochemical cell, will ordinarily contain from about 0.005 to 2 meq. of —COOH functional group per gram of polymer. Optionally, it may also contain up to 2 meq. of other functional groups per gram of polymer, the other functional groups being —COOR, —COOM, —SO$_2$W, SO$_3$H or —SO$_3$M, where R is C$_1$ to C$_8$ alkyl, M is Na or K, and W is F or Cl. The polymer will ordinarily have a total ion exchange capacity of at least 0.6 meq/g, preferably 0.8 to 1.4 meq/g.

The process is especially useful with polymer which contains only —COOH functional groups, or a mixture of both —COOH and —COOR functional groups in any proportion.

If there are any free sulfonic acid groups —SO$_3$H present in the polymer, reaction with a specified compound such as an ortho ester will esterify them to sulfonic ester groups —SO$_3$R.

The following examples are provided to further illustrate the innovative aspects of the invention.

EXAMPLES

Example 1

A film 51 microns (2 mils) thick of a copolymer of tetrafluoroethylene and methyl perfluoro(4,7-dioxa-5-methyl-8-nonenoate) having an equivalent weight of 1100 was prepared as disclosed in South African Pat. No. 78/2225. The film was stored under ambient conditions in air for six months, at the end of which time, the carbomethoxy groups had almost completely hydrolyzed to free carboxylic acid groups, as shown by its infrared spectrum.

A sample of the film was placed in trimethyl orthoformate and heated to boiling for 20 minutes. After the film sample was dried, examination by infrared spectral analysis showed that conversion of the free carboxylic acid groups to carbomethoxy groups was complete.

Examples 2 and 3

The procedure of Example 1 was twice repeated, using in place of trimethyl orthoformate, dimethyl sulfite (Ex. 2) and trimethyl borate (Ex. 3). Again, conversion of carboxylic acid groups to carbomethoxy groups was confirmed by infrared analysis.

Examples 4 and 5

The procedure of Example 1 was twice repeated, using in place of trimethyl orthoformate, 2,2-dimethoxypropane (Ex. 4) and 2,5-dimethoxytetrahydrofuran (Ex. 5). Again, conversion of carboxylic acid groups to carbomethoxy groups was confirmed by infrared analysis. In these two examples, some discoloration was observed.

Example 6

Into 10 ml of trimethyl orthoformate was placed 5 g of a copolymer of tetrafluoroethylene and methyl perfluoro(4,7-dioxa-5-methyl-8-nonenoate) having an equivalent weight of 1064 in the form of pellets approximately cube-shaped, and the mixture was heated on a steam bath for one hour. At the end of that time, the liquid phase was poured off, the pellets were dried under a stream of nitrogen, and then more thoroughly dried overnight in a vacuum oven at 110° C. The next day the pellets were removed from the oven, and permitted to cool under nitrogen.

A portion of the resulting cubes was pressed into a film 64 microns (2.5 mils) thick in a press at 250° C. and 2758 kilopascals (400 psi). The resulting film was hydrolyzed to the potassium carboxylate form by placing in an aqueous hydrolysis bath containing 15% by wt. of potassium hydroxide and 25% by wt. of dimethylsulfoxide at 80° C. for one hour. The film was washed with distilled water, soaked in 2% by wt aqueous sodium hydroxide solution for two hours, then mounted in a small chloralkali cell. Electrolysis of brine was carried out in this cell for 1 day at 4.3 volts and current density of 5.0 kA/m$^2$ at a current efficiency above 90%, with no signs of pitting of the membrane.

INDUSTRIAL APPLICABILITY

The process of the invention for esterifying fluorinated polymers having carboxylic acid groups to the corresponding polymers having carboalkoxy groups is especially useful for reesterifying carboxylic groups which have become hydrolyzed by contact with an aqueous wash bath, an aqueous quench bath following extrusion, moisture in the atmosphere, or electrolyte in an electrochemical cell. The product polymer from the process can be extruded without decarboxylation, and adheres well to other fluorinated polymers in lamination processes. The process of the invention is surprisingly rapid and complete, and can be incorporated as one step in a continuous processing line prior to extrusion of the polymer. Following hydrolysis of a fabricated article so that the functional groups are in ion-exchange form, the article is useful for general ion exchange purposes, e.g., film or membrane to separate the compartments of an electrochemical cell, such as a chloralkali cell.

A particular advantage of the invention lies in that embodiment wherein film or membrane is prepared from fluorinated polymer with carboxylic acid groups which has been esterified in accordance with the invention while in comminuted or finely divided form prior to preparation of the film or membrane. Film and membrane so made are not susceptible to pitting during start-up and operation of a chloralkali cell, whereas film and membrane made from polymer not subjected to the process of the invention have sometimes been found to develop pits during electrolysis of brine in a chloralkali cell. Pits in a membrane are, of course, deleterious, as pitted membrane operates at lower current efficiency.

The invention is also useful in analytical work on fluorinated polymers having carboxylic groups, to place such polymers in form having all the carboxylic groups in ester form before carrying out analyses such as equivalent weight determinations, so as to have the polymer consistently in a known form before the analytical test is begun.

The invention is also useful as a step in the repair of damaged membranes. For example, a film or membrane which has a layer of carboxylate polymer, and a layer of another perfluorinated polymer which has sulfonic acid groups or Na or K salt thereof, can be treated in accordance with the process of the invention to esterify the carboxylate polymer layer. To the damaged portion, e.g., a tear or pinhole, a patch of perfluorinated polymer having carboxylic ester functional groups can be applied and secured with the aid of heat and pressure.

I claim:

1. A process for preparing a second fluorinated polymer having —COOR functional groups where R is $C_1$ to $C_8$ alkyl from a first fluorinated polymer having —COOH functional groups, which process comprises contacting said first polymer with a compound selected from the group consisting of

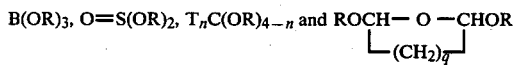

where n is 0, 1 or 2, T is H or $C_1$ to $C_8$ alkyl and two T's taken together can be —$(CH_2)_p$— where p is 4 or 5, and q is 2 or 3, at a temperature between 20° C. and the decomposition temperature of said compound, and separating said second polymer from the product of said contacting.

2. The process of claim 1 wherein said polymer is perfluorinated, contains 0.002 to 2 meq. of said —COOH functional group per gram of polymer and 0 to 2 meq. of other functional groups per gram of polymer, said other functional groups being from the group consisting of —COOR, —COOM, —$SO_2W$, —$SO_3H$ and —$SO_3M$, where M is Na or K, and W is F or Cl, and has a total ion exchange capacity of at least 0.6 meq/g of polymer.

3. The process of claim 2 wherein said other functional groups are —COOR only.

4. The process of claim 3 wherein R is $C_1$ to $C_3$ alkyl.

5. The process of claim 4 wherein said reagent is $B(OCH_3)_3$ or $O=S(OCH_3)_2$.

6. The process of claim 4 wherein said reagent is

7. The process of claim 6 wherein said reagent is trimethyl orthoformate or trimethyl orthoacetate.

8. The process of claim 6 wherein said reagent is 2,2-dimethoxypropane or 2,5-dimethoxytetrahydrofuran.

9. The process of claim 2 or 6 wherein said first polymer has —COOH functional groups as part of —$O(CF_2)_mCOOH$ moieties, where m is 1, 2 or 3.

10. The process of claim 9 wherein said first polymer is in comminuted form, film or membrane.

11. The process of claim 10 wherein said first polymer is in comminuted form, and further comprising extruding said second polymer into film.

12. The process of claim 9 wherein said first polymer is in the form of a layer of a laminar film or membrane which also has a layer of another perfluorinated polymer which has —$SO_3H$ and/or —$SO_3M$ groups where M is Na or K.

13. The process of claim 9 wherein m is 2.

14. The process of claim 12 wherein said first polymer is in comminuted form, film or membrane.

* * * * *